United States Patent [19]
Enomoto

[11] Patent Number: 6,098,452
[45] Date of Patent: Aug. 8, 2000

[54] MACHINE CONTROL GAGE SYSTEM PERFORMING ROUGHNESS AND ROUNDNESS MEASURING FUNCTIONS

[75] Inventor: Masato Enomoto, Mitaka, Japan

[73] Assignee: Tokyo Seimitsu Co., Ltd., Tokyo, Japan

[21] Appl. No.: 09/170,162

[22] Filed: Oct. 13, 1998

[30] Foreign Application Priority Data

| Oct. 17, 1997 | [JP] | Japan | 9-285440 |
| Nov. 21, 1997 | [JP] | Japan | 9-320882 |

[51] Int. Cl.⁷ .................................................. B23Q 17/09
[52] U.S. Cl. .............................. 73/104; 33/503; 702/151
[58] Field of Search .............................. 73/104, 105, 78; 33/503, 504; 702/150, 151

[56] References Cited

U.S. PATENT DOCUMENTS

| 4,080,741 | 3/1978 | Siddall et al. | 33/502 |
| 4,084,324 | 4/1978 | Whitehouse | 33/504 |
| 4,695,982 | 9/1987 | Preysman | 702/157 |
| 5,434,803 | 7/1995 | Yoshida | 702/168 |
| 5,926,781 | 7/1999 | Scott | 702/151 |

*Primary Examiner*—Max Noori
*Attorney, Agent, or Firm*—Oliff & Berridge, PLC

[57] ABSTRACT

The machine control gage system measures the size of a workpiece through a measuring head while a machining tool machines the workpiece. When the measured size of the workpiece reaches a preset size, the machine control gage system commands the machining tool to stop machining the workpiece. The machine control gage system also performs roundness and surface roughness measurement of the workpiece as well as in-process control functions. On completion of the machining, the machine control gage system obtains and samples shape data on the workpiece through the measuring head and performs a predetermined processing for the sampled data, so that the roundness and surface roughness measurement can be performed automatically.

3 Claims, 6 Drawing Sheets

F I G. 1
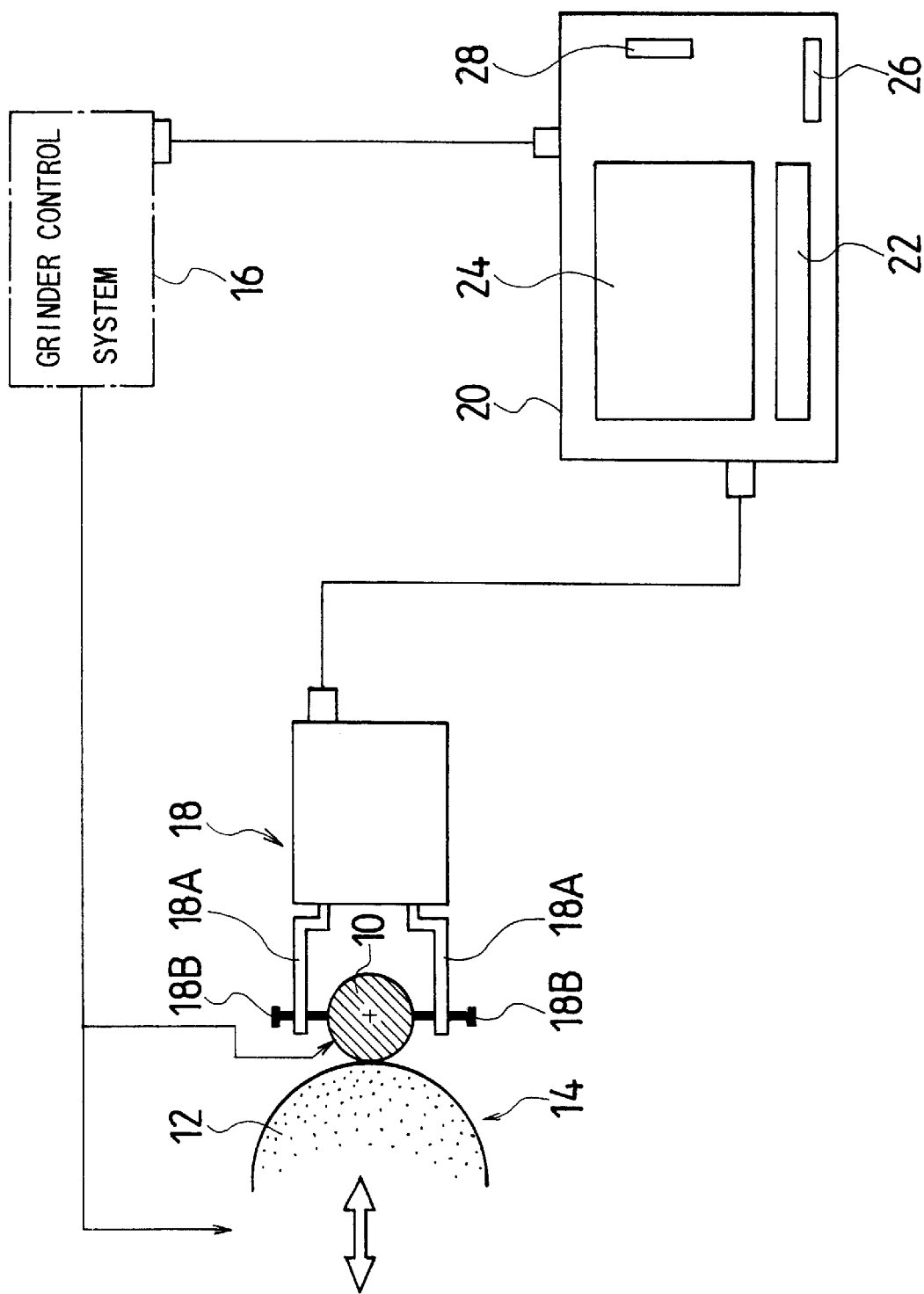

MACHINE CONTROL GAGE SYSTEM PERFORMING ROUGHNESS AND ROUNDNESS MEASURING FUNCTIONS

BACKGROUND OF THE INVENTION

1. Field of the Invention

The present invention relates generally to a machine control gage system, which performs roundness and surface roughness measuring functions, and more particularly to a machine control gage system that performs roundness and surface roughness measuring functions of calculating roundness and surface roughness, etc. of a workpiece after machining.

2. Description of Related Art

A machine control gage system measures the size of a workpiece during machining so as to control machine tools in realtime in a production line, etc. For example, in a grinding apparatus, when the size of the workpiece measured during the machining reaches respective preset sizes, the machine control gage system commands the grinding apparatus to change the grinding from rough grinding to fine grinding and from the fine grinding to spark-out grinding, and to move a wheel spindle stock backward.

When the roundness and surface roughness of the workpiece machined by the machine tools with the conventional machine control gage system are measured, the workpiece must be unloaded from the machine tools on completion of the machining or in the middle of the production line. For this reason, the roundness and surface roughness of the workpiece cannot be automatically measured in the production line, and thus, the measurement is complicated.

SUMMARY OF THE INVENTION

The present invention has been developed in view of the above-described circumstances, and has as its object the provision of a machine control gage system that offer in-line roundness and surface roughness measurements for a workpiece, which has been machined by machine tools with the machine control gage system.

To achieve the above-mentioned object, the present invention is directed to the machine control gage system for measuring the size of a workpiece while a machine tool machines the workpiece and commanding the machine tool to stop machining when the measured size of the workpiece reaches a preset size, the machine control gage system comprising: a shape data obtaining means for obtaining shape data on the workpiece after the machine tool stops machining the workpiece; a surface roughness calculating means for analyzing surface roughness of the workpiece in accordance with the shape data; and a roundness calculating means for analyzing roundness of the workpiece in accordance with the shape data.

According to the present invention, the machine control gage system, which is used in the production line, performs the roundness and surface roughness measuring functions to measure roundness, surface roughness, etc. of the workpiece after the machining. This offers in-line roundness and surface roughness measurements without the necessity for unloading the workpiece from the machine tool.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view illustrating the entire structure of a machine control gage system according to the present invention, which is applied to a grinding apparatus;

DETAILED DESCRIPTION OF THE PREFERRED EMBODIMENT

Figure 2:
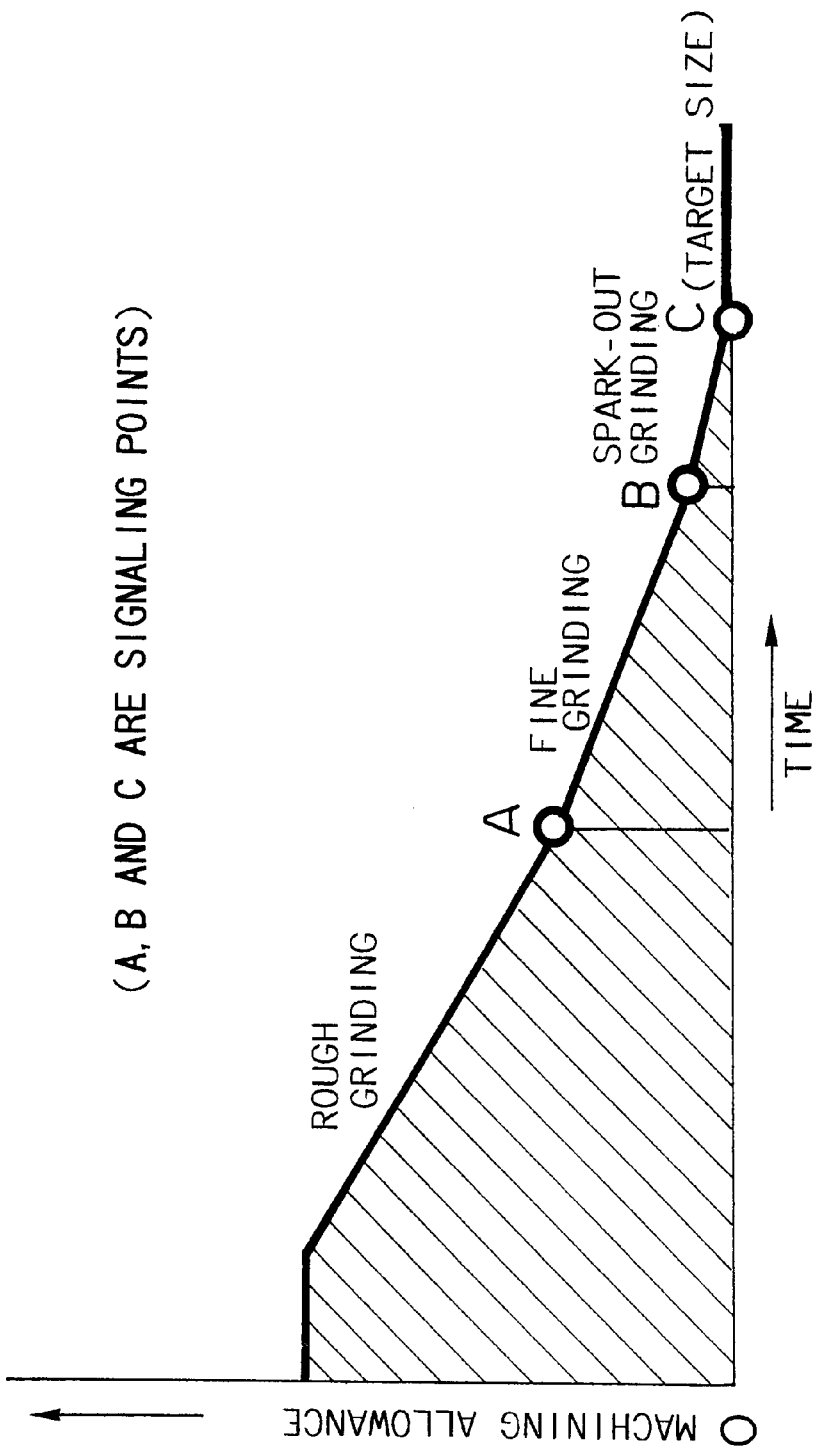
FIG. 2 is a view showing the working procedure of the grinding apparatus.

This invention will be described in further detail by way of example with reference to the accompanying drawings.

FIG. 1 shows the entire structure of a machine control gage system according to an embodiment of the present invention, which is applied to a cylinder grinding apparatus. As shown in FIG. 1, the grinding apparatus comprises a grinder 14, which grinds a workpiece 10 with a grindstone 12, and a grinder control system 16 (hereinafter referred to as a control system 16), which controls the grinder 14. The grindstone 12 is rotated and moved forward and backward vertically with respect to a rotary shaft under control of the control system 16. The workpiece 10 loaded on the grinder 14 is also rotated under control of the control system 16.

The machine control gage system comprises a measuring head 18, which is applied to the workpiece 10, and a control unit 20, which analyzes the measurement data output from the measuring head 18. The measuring head 18 has two fingers 18A, and contacts 18B are attached to the ends of the fingers 18A. The fingers 18A are capable of swinging about fulcrums within the body of the measuring head 18 so that the tips of the contacts 18B come into contact with the outer peripheral surface of the workpiece 10. Accordingly, the fingers 18A are displaced according to the size of the workpiece 10, and the measuring head 18 outputs an electric signal according to the displacement of the fingers 18A with a differential transformer within the body thereof. The control unit 20 receives the electric signal as the measurement data of the size of the workpiece 10.

The control unit 20 comprises a control board 22, through which commands such as setting information are entered, an LCD 24, which shows the measured results and control pictures, a PC card slot 26, into which a PC card is inserted to store the measured results. A printer connector 28 connects with a printer as need arises so that the measured results, etc. can be printed out.

The control unit 20 connects with the control system 16 of the grinding apparatus through a cable, and it outputs a variety of commands to the control system 16 so as to automatically control the grinding apparatus. FIG. 2 shows a relation between the machining time and the machining allowance during the machining. The control unit 20 receives the data representing the size of the workpiece 10 from the measuring head 18 while the workpiece 10 is machined. When the size of the workpiece 10 reaches a first predetermined size (A in FIG. 2), the control unit 20 outputs a first changeover signal to change the grinding from rough grinding to fine grinding. When the size of the workpiece 10 reaches a second predetermined size (B in FIG. 2), the control unit 20 outputs a second changeover signal to change the grinding from the fine grinding to spark-out grinding. When the size of the workpiece 10 reaches a third predetermined size (C in FIG. 2), which is a target size, the control unit 20 outputs a machining end signal to the control system 16, and the control system 16 moves the grindstone 12 backward to end the machining.

After the machining, the control unit 20 obtains and samples the shape data on the workpiece 10 through the measuring head 18, and performs a roundness analyzing function of calculating roundness, cylindricity, concentricity, etc. of the workpiece 10 and a roughness analyzing function of calculating surface roughness parameters of the workpiece 10 from the sampled shape data. For example, the control unit 20 moves the grindstone 12 away from the workpiece 10 on completion of machining, and rotates only the workpiece 10 to obtain and sample the measurement data on the workpiece 10 with the measuring head 18. Then, the control unit 20 calculates roundness, cylindricity, coaxiality, and surface roughness parameters of the workpiece 10 from the sampled measurement data.

Figure 3:
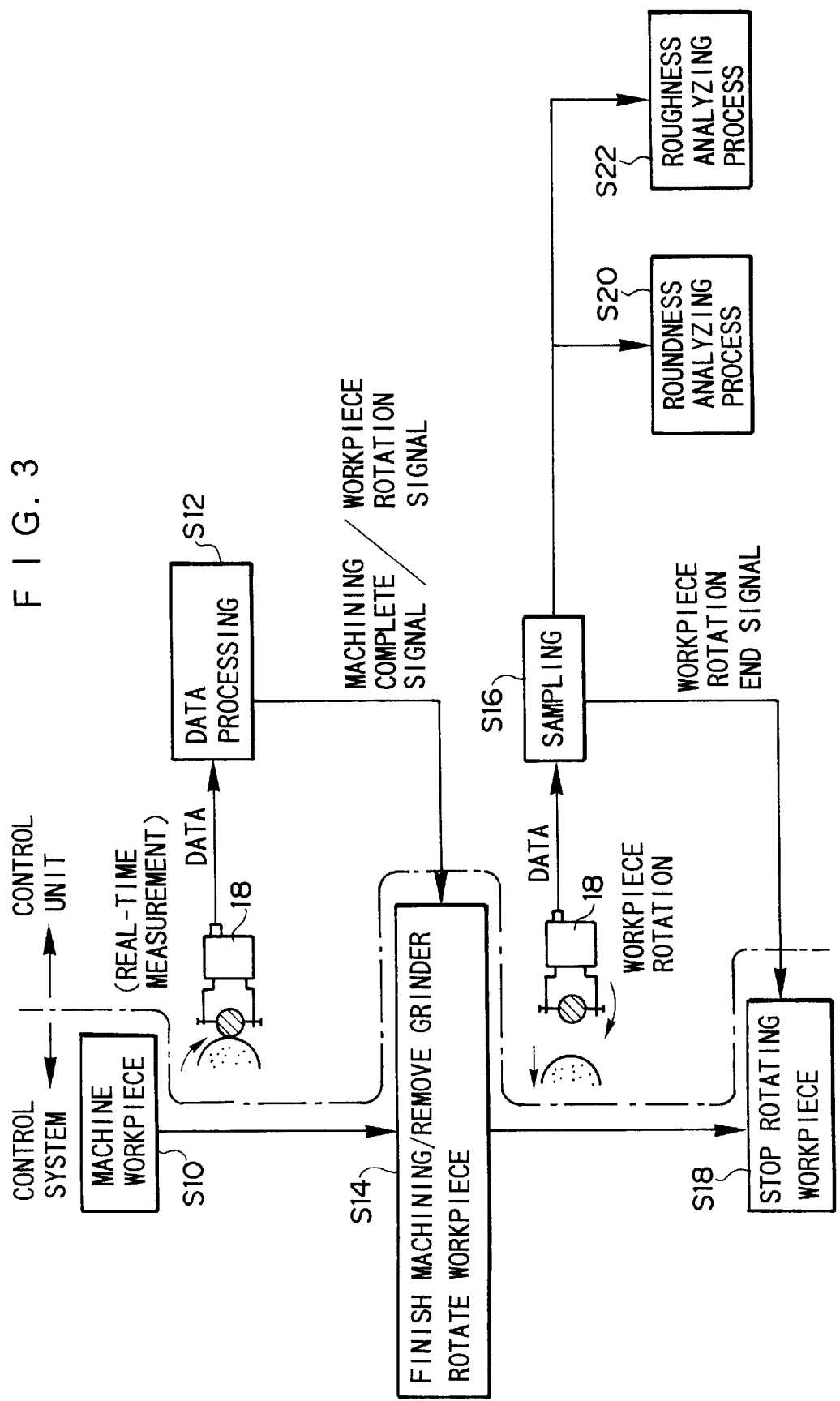
FIG. 3 is a flow chart showing the control procedures of a controller in the grinding apparatus and a control unit in the machine control gage system.

FIG. 3 is a flow chart showing the control procedures for the control system 16 of the grinding apparatus and the control unit 20 of the machine control gage system. In FIG. 3, the control procedure for the control system 16 is described at the left side of an alternate long and short dash line, and the control procedure for the control unit 20 is described at the right side thereof.

First, the control system 16 starts to machine the workpiece 10 on reception of a command from the control unit 20 (S10). Specifically, on reception of a machining start signal from the control unit 20, the control system 16 rotates the grindstone 12 and moves the grindstone 12 forward until the grindstone 12 is pressed against the workpiece 10, thereby starting to machine the workpiece 10.

During the machining, the control unit 20 receives the measurement data from the measuring head 18 and measures the size of the workpiece 10 in a predetermined data processing (S12). The control unit 20 determines whether the size of the workpiece 10 has reached the predetermined size (the target size) or not. When the size of the workpiece 10 reaches the predetermined size, the control unit 20 outputs the machining end signal and a workpiece rotate signal to the control system 16. The target size of the workpiece 10 can be preset by manipulating the control board 22, or the like at the control unit 20. As described previously, the control unit 20 also changes the grinding from the rough grinding to the fine grinding and from the fine grinding to the spark-out grinding, etc., but an explanation thereof will not be given.

On reception of the machining end signal from the control unit 20, the control system 16 moves the grindstone 12 away from the workpiece 10 to end the machining (S14). On reception of the machining end signal and the workpiece rotate signal from the control unit 20, the control system 16 rotates the workpiece 10 after the machining.

While the workpiece 10 is rotating after the machining, the control unit 20 obtains and samples the measurement data on the workpiece 10 through the measuring head 18 (S16). On completion of the data sampling (e.g., the obtainment of the data related to one rotation of the workpiece 10), the control unit 20 outputs a workpiece rotation end signal to the control system 16, and the control system 16 stops rotating the workpiece 10 (S18).

After the data sampling, the control unit 20 performs the roundness analysis (S20) and the roughness analysis (S22) in accordance with the sampled measurement data.

Figure 4:
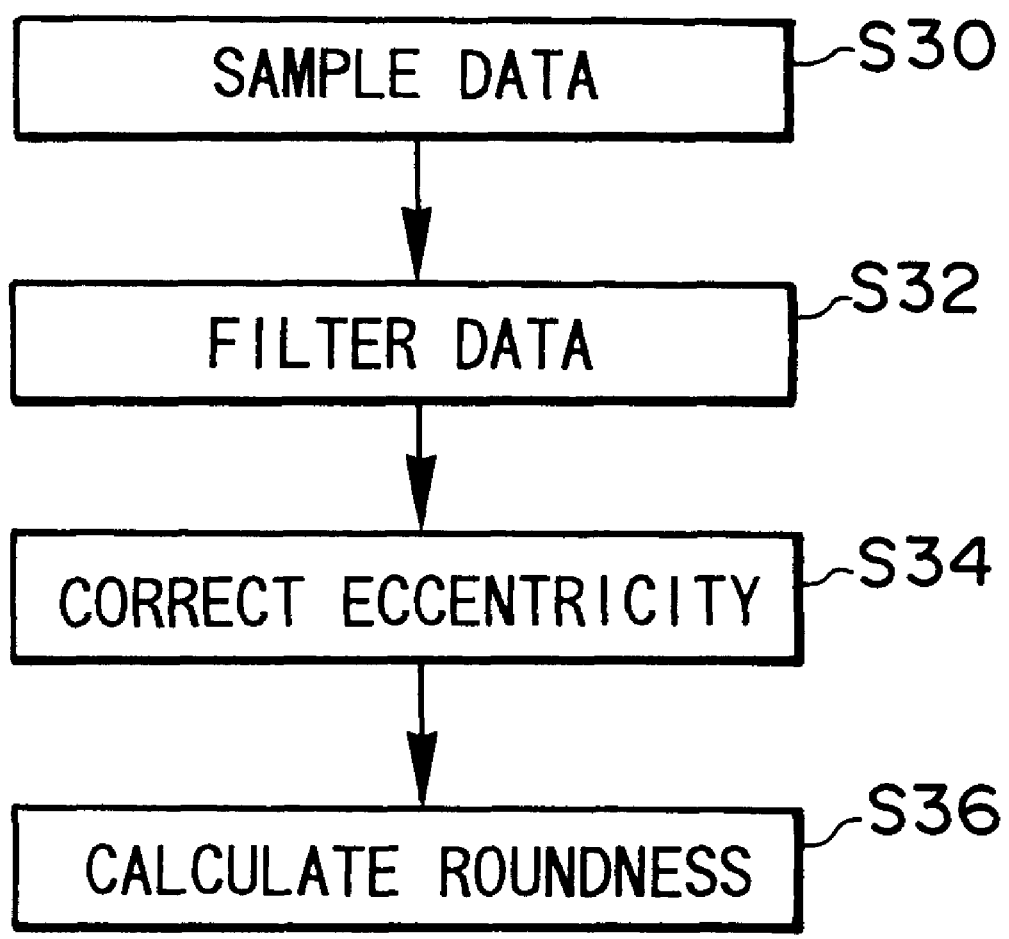
FIG. 4 is a flow chart showing the procedure for the control unit to find the roundness in a roundness analysis.

FIG. 4 is a flow chart showing the procedure for the control unit 20 to calculate the roundness in the roundness analyzing processing at S20. First, the control unit 20 obtains and samples the measurement data on the workpiece 10 through the measuring head 18 in the processing at S16 shown in FIG. 3. Thus, the control unit 20 obtains the necessary data for analysis (S30). The data obtainment is a standard function, which is also performed when the size of the workpiece is determined by the normal inprocess control function.

Then, the sampled measurement data are filtered (S32). In the filtering process, the user sets a desired cutoff value, and noise components of short wavelength and signals of wavelength areas except for wavelength areas necessary for analysis are eliminated.

After the filtering process, the control unit 20 finds an axis of the workpiece 10 (the center of the measured section) from the measurement data so as to correct the eccentric deviation of the measurement data (S34). Then, the control unit 20 finds a difference in radius between an inscribed circle and a circumscribed circle of the measured section, of which centers are the same as the center of the measured section found from the measurement data at S34, thereby finding the roundness of the workpiece 10 (S36).

Figure 5:
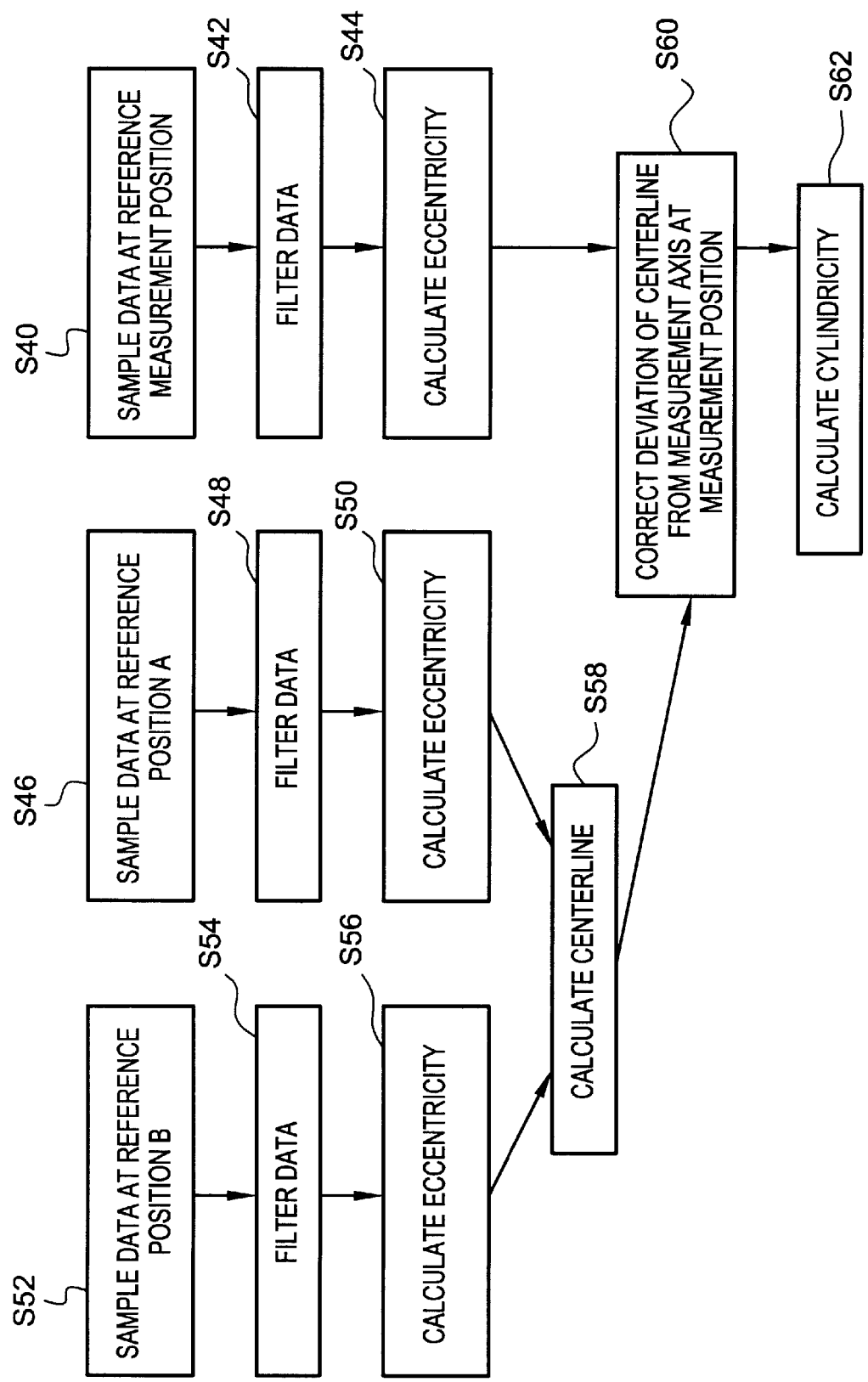
FIG. 5 is a flow chart showing the procedure for the control unit to find the cylindricity in the roundness analysis.

FIG. 5 is a flow chart showing the procedure for the control unit 20 to calculate the cylindricity of the workpiece 10 in the roundness analyzing processing at S20. To calculate the cylindricity, it is necessary to apply three measuring heads just like the measuring head 18 to the workpiece 10. One measuring head is arranged at the measurement position, and the other two measuring heads are arranged at two positions (reference positions A & B) on both sides of the measurement position so as to correct the deviation of the measurement data caused by tilt of the workpiece 10.

First, the control unit 20 obtains and samples the shape data on the workpiece 10 through the measuring heads at the measurement position and the reference positions A & B so as to obtain necessary data for analysis (S40, S46 & S52). The control unit 20 is capable of obtaining the measurement data through a plurality of measuring heads simultaneously.

After sampling the measurement data through the measuring heads, the control unit 20 performs filtering processes for the measurement data from respective measuring heads (S42, S48 & S54). These filtering processes are the same in S32 of FIG. 4.

After the filtering process, the control unit 20 calculates the eccentricity, which is the deviation of the center of the measured section with respect to the measurement axis, at each of the measurement position and the reference positions A & B from the measurement data at each position (S44, S50 & S56).

Then, the control unit 20 calculates the centerline (the axis) of the workpiece from the eccentricities at the reference positions A & B, which are calculated at S50 & S56 (S58). The control unit 20 corrects the deviation of the centerline from the measurement axis at the measurement position in accordance with the calculated centerline and the eccentricity at the measurement position, which is calculated at S44 (S60). Then, the control unit 20 finds a difference in radius between an inscribed circle and a circumscribed circle of the measured section, of which centers are the same as the center obtained by the eccentricity correction, thereby finding the cylindricity of the workpiece 10 (S62).

The coaxiality, the concentricity, etc. of the workpiece 10 are found in the normal roundness analysis in the same manner as the above-described roundness analysis (S20) in which the roundness and the cylindricity are found.

Figure 6:
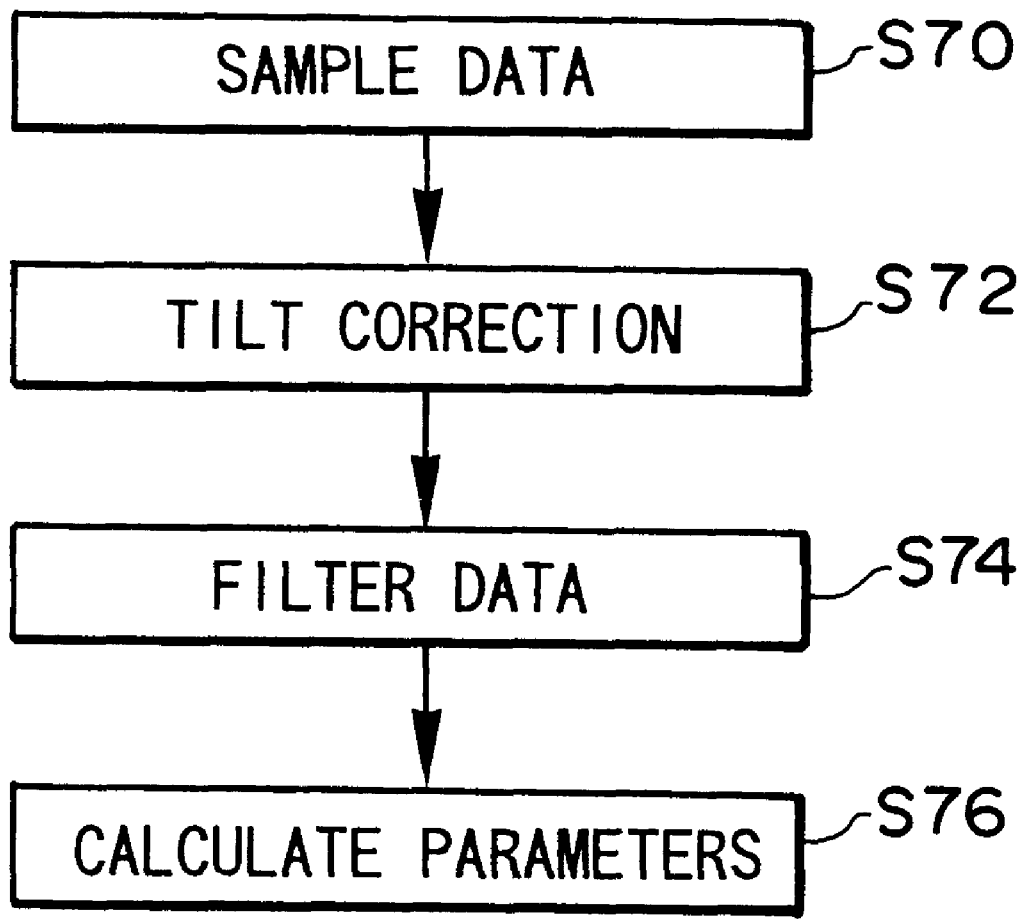
FIG. 6 is a flow chart showing the procedure for the control unit to find the surface roughness parameters in a roughness analysis.

FIG. 6 is a flow chart showing the procedure for the control unit 20 to calculate the surface roughness parameters in the roughness analysis (S22) in FIG. 3. First, the control unit 20 obtains and samples the shape data through the measuring head 18 (S16 in FIG. 3) to obtain necessary data (S70). The control unit 20 corrects the deviation of the sampled measurement data caused by the tilt of the workpiece 10 (S72), the control unit 20 performs a filtering process, which is required for calculating the surface roughness parameters (S74). Thereafter, the control unit 20 calculates the surface roughness parameters (e.g., the centerline average height, the maximum height, and the 10-points mean roughness) (S76).

As stated above, the control unit 20 of the machine control gage system performs the roundness and roughness analyzing functions as well as the ordinary in-process control function, so that the roundness and roughness of the machined workpiece can be analyzed automatically after the machining without removing the workpiece from the production line.

As set forth hereinabove, the machine control gage system of the present invention, which is used in the production line, performs the roundness and surface roughness measuring functions so that the roundness and surface roughness of the workpiece can be measured automatically after the machining without removing the workpiece from the machine tools.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A machine control gage system with a roundness measuring function, comprising:

workpiece size measuring means for measuring a size of a workpiece by a measuring head while a machine tool is machining the workpiece;

gaging control means for controlling a gaging operation by instructing the machine tool to stop machining the workpiece when detecting that the size of the workpiece measured by the workpiece size measuring means reaches a preset size;

shape data obtaining means for obtaining shape data on the workpiece from the measuring head without detaching the workpiece from the machine tool after the machine tool finishes machining the workpiece in response to the instruction from the gaging control means; and roundness calculating means for analyzing a roundness in accordance with the shape data obtained from the shape data obtaining means.

2. A machine control gage system with a roughness measuring function, comprising:

workpiece size measuring means for measuring a size of a workpiece by a measuring head while a machine tool is machining the workpiece;

gaging control means for controlling a gaging operation by instructing the machine tool to stop machining the workpiece when detecting that the size of the workpiece measured by the workpiece size measuring means reaches a preset size;

shape data obtaining means for obtaining shape data on the workpiece from the measuring head without detaching the workpiece from the machine tool after the machine tool finishes machining the workpiece in response to the instruction from the gaging control means;

surface roughness calculating means for analyzing a surface roughness shape of a workpiece in accordance with shape data obtained from the shape data obtaining means.

3. A machine control gage system with a roughness/roundness measuring function, comprising:

workpiece size measuring means for measuring a size of a workpiece by a measuring head while a machine tool is machining the workpiece;

gaging control means for controlling a gaging operation by instructing the machine tool to stop machining the workpiece when detecting that the size of the workpiece measured by the workpiece size measuring means reaches a preset size;

shape data obtaining means for obtaining shape data on the workpiece from the measuring head without detaching the workpiece from the machine tool after the machine tool finishes machining the workpiece in response to the instruction from the gaging control means;

surface roughness calculating means for analyzing surface roughness of the workpiece in accordance with the shape data; and roundness calculating means for analyzing roundness of the workpiece in accordance with the shape data.

* * * * *